United States Patent
Hayashi et al.

(10) Patent No.: US 9,325,008 B2
(45) Date of Patent: *Apr. 26, 2016

(54) SOLID ELECTROLYTE BATTERY AND POSITIVE ELECTRODE ACTIVE MATERIAL

(75) Inventors: Saori Hayashi, Kanagawa (JP); Yuichi Sabi, Tokyo (JP); Susumu Sato, Miyagi (JP)

(73) Assignee: SONY CORPORATION, Tokyo (JP)

( * ) Notice: Subject to any disclaimer, the term of this patent is extended or adjusted under 35 U.S.C. 154(b) by 22 days.

This patent is subject to a terminal disclaimer.

(21) Appl. No.: 14/116,646

(22) PCT Filed: May 15, 2012

(86) PCT No.: PCT/JP2012/062885
§ 371 (c)(1),
(2), (4) Date: Dec. 2, 2013

(87) PCT Pub. No.: WO2012/157774
PCT Pub. Date: Nov. 22, 2012

(65) Prior Publication Data
US 2014/0099541 A1    Apr. 10, 2014

(30) Foreign Application Priority Data
May 16, 2011    (JP) ................. 2011-109924

(51) Int. Cl.
*H01M 4/58* (2010.01)
*H01M 10/0562* (2010.01)
(Continued)

(52) U.S. Cl.
CPC .......... *H01M 4/5825* (2013.01); *H01M 10/052* (2013.01); *H01M 10/0562* (2013.01); *H01M 6/40* (2013.01); *H01M 10/0585* (2013.01); *Y02E 60/122* (2013.01); *Y02P 70/54* (2015.11)

(58) Field of Classification Search
CPC ...................................................... H01M 4/58
See application file for complete search history.

(56) References Cited

U.S. PATENT DOCUMENTS

| 2004/0110065 A1* | 6/2004 | Hamano et al. ............ 429/231.3 |
| 2005/0003273 A1* | 1/2005 | Hagiwara ............. C01B 35/121 |
| | | 429/231.95 |

(Continued)

FOREIGN PATENT DOCUMENTS

| JP | 2008-257963 | 10/2008 |
| JP | 2010-182447 | 8/2010 |

(Continued)

OTHER PUBLICATIONS

Kim et al., Li—B—O—N electrolytes for all-solid-state thin film batteries, Journal of Power Sources, 2009, pp. 211-216, vol. 189.

(Continued)

*Primary Examiner* — Patrick Ryan
*Assistant Examiner* — Alex Usyatinsky
(74) *Attorney, Agent, or Firm* — Hazuki International, LLC (57) ABSTRACT

Provided are: a solid electrolyte battery using a novel positive electrode active material that functions in an amorphous state; and a novel positive electrode active material that functions in an amorphous state. The solid electrolyte battery includes: a positive electrode layer including a positive electrode active material layer; a negative electrode layer; and a solid electrolyte layer formed between the positive electrode layer and the negative electrode layer, and the positive electrode active material includes a lithium-boric acid compound in an amorphous state, which contains Li, B, any element M1 selected from Cu, Ni, Co, Mn, Au, Ag, and Pd, and O.

9 Claims, 7 Drawing Sheets

(51) Int. Cl.
*H01M 10/052* (2010.01)
*H01M 10/0585* (2010.01)
*H01M 6/40* (2006.01)

(56) References Cited

U.S. PATENT DOCUMENTS

2011/0281167 A1* 11/2011 Sabi et al. .................. 429/221
2012/0183857 A1* 7/2012 Isono et al. ................ 429/223

FOREIGN PATENT DOCUMENTS

| JP | 2010-182448 | 8/2010 |
| JP | 2011-023335 | 2/2011 |
| JP | 2011-060562 | 3/2011 |
| JP | 2011-081923 | 4/2011 |

OTHER PUBLICATIONS

Bates et al., "Thin-film lithium and lithium-ion batteries", Solid State Ionics, 2000, pp. 33-45, vol. 135.

* cited by examiner

SOLID ELECTROLYTE BATTERY AND POSITIVE ELECTRODE ACTIVE MATERIAL

CROSS REFERENCES TO RELATED APPLICATIONS

The present application is a national stage of International Application No. PCT/JP2012/062885 filed on May 15, 2012 and claims priority to Japanese Patent Application No. 2011-109924 filed on May 16, 2011, the disclosure of which is incorporated herein by reference.

BACKGROUND

The present technique relates to a solid electrolyte battery and a positive electrode active material. More particularly, the technique relates to a thin-film solid electrolyte battery that has a battery constituent member formed from a thin film with the use of a thin-film deposition technique, and a positive electrode active material for use in this battery.

BACKGROUND ART

Lithium ion secondary batteries with the use of lithium ion doping and dedoping have been widely used in portable electronic devices, etc., because of having excellent energy densities. Among these lithium ion secondary batteries, in terms of safety and reliability, the research and development of all-solid lithium ion secondary batteries using, as an electrolyte, a solid electrolyte containing no organic electrolytic solution have been advanced intensively.

The development of thin-film lithium secondary batteries has been actively carried out as a form of this all-solid lithium ion secondary battery. These thin-film lithium secondary batteries are obtained as secondary batteries, in such a way that current collectors, active materials, and electrolytes, etc. constituting the batteries are formed from thin films. The respective thin films constituting the thin-film lithium secondary batteries are formed with the use of film formation methods such as a sputtering method and a vapor deposition method. (For example, see Non-Patent Document 1.)

Amorphous materials such as LiPON of $Li_3PO_4$ with nitrogen substitution and LiBON of $Li_xB_2O_3$ with nitrogen substitution are used as solid electrolytes for use in the thin-film lithium secondary batteries. (For example, see Non-Patent Document 2.)

In addition, in conventional thin-film lithium secondary batteries, it is common to use, as positive electrode active materials, lithium-transition metal oxides such as $LiCoO_2$, $LiMn_2O_4$, and $LiFePO_4$, as in liquid lithium-ion secondary batteries.

CITATION LIST

Non-Patent Document

Non-Patent Document 1: Thin-Film lithium and lithium-ion batteries, J. B. Bates et al.: Solid State Ionics, 135, 33 (2000)
Non-Patent Document 2: Journal of Power Sources 189 (2009)211-216

SUMMARY

Problems to be Solved by the Invention

Thin-film solid electrolyte batteries such as thin-film lithium secondary batteries requires the use of expensive heat-resistant glass as substrates in the case of carrying out substrate heating or post-anneal after the deposition, thus increasing the manufacturing cost. In addition, in the solid electrolyte batteries, LiPON, LiBON, and the like for use as solid electrolyte are materials that function in amorphous states, and thus, annealing these materials will cause characteristic degradation.

For this reason, it is preferable to also use, for positive electrode active materials, materials that function even in a non-annealing way, while lithium-transition metal oxides such as $LiCoO_2$, $LiMn_2O_4$, and $LiFePO_4$ are highly non-crystalline in a non-annealing way, and thus poor in property as positive electrode active materials. More specifically, the lithium-transition metal oxides such as $LiCoO_2$, $LiMn_2O_4$, and $LiFePO_4$ are, in a non-annealing way, lower in ion conductivity than solid electrolytes such as LiPON, and thus poor in property as positive electrode active materials.

Therefore, an object of the present technique is to provide a solid electrolyte battery using a novel positive electrode active material that functions in an amorphous state, and a novel positive electrode active material that functions in an amorphous state.

Solutions to Problems

In order to solve the problems mentioned above, the present technique provides a solid electrolyte battery including: a positive electrode layer including a positive electrode active material layer; a negative electrode layer; and a solid electrolyte layer placed between the positive electrode layer and the negative electrode layer, where the positive electrode active material includes a lithium-boric acid compound in an amorphous state, which contains Li, B, and any element M1 selected from Cu, Ni, Co, Mn, Au, Ag, and Pd, and O.

The present technique provides a positive electrode active material where a lithium-boric acid compound containing Li, B, and any element M1 selected from Cu, Ni Co, Mn, Au, Ag, and Pd, and O, has an amorphous state.

In the present technique, the positive electrode active material layer contains a lithium-boric acid compound containing: Li; B; any element M1 selected from Cu, Ni, Co, Mn, Au, Ag, and Pd; and O. This lithium-boric acid compound in an amorphous state functions as a positive electrode active material.

Effects of the Invention

According to the present technique, a solid electrolyte battery using a novel positive electrode active material that functions in an amorphous state, and a novel positive electrode active material that functions in an amorphous state can be provided.

Additional features and advantages are described herein, and will be apparent from the following Detailed Description and the figures.

DETAILED DESCRIPTION

Embodiments of the present technique will be explained below with reference to the drawings. The explanation will be given in the following order. It is to be noted that the same or corresponding portions are denoted by the same reference signs through all of the drawings according to the embodiments.

1. First Embodiment (First Example of Solid Electrolyte Battery)
2. Second Embodiment (Second Example of Solid Electrolyte Battery)
3. Other Embodiments (Modification Examples)

1. First Embodiment (Configuration Example of Solid Electrolyte Battery)

Figure 1:
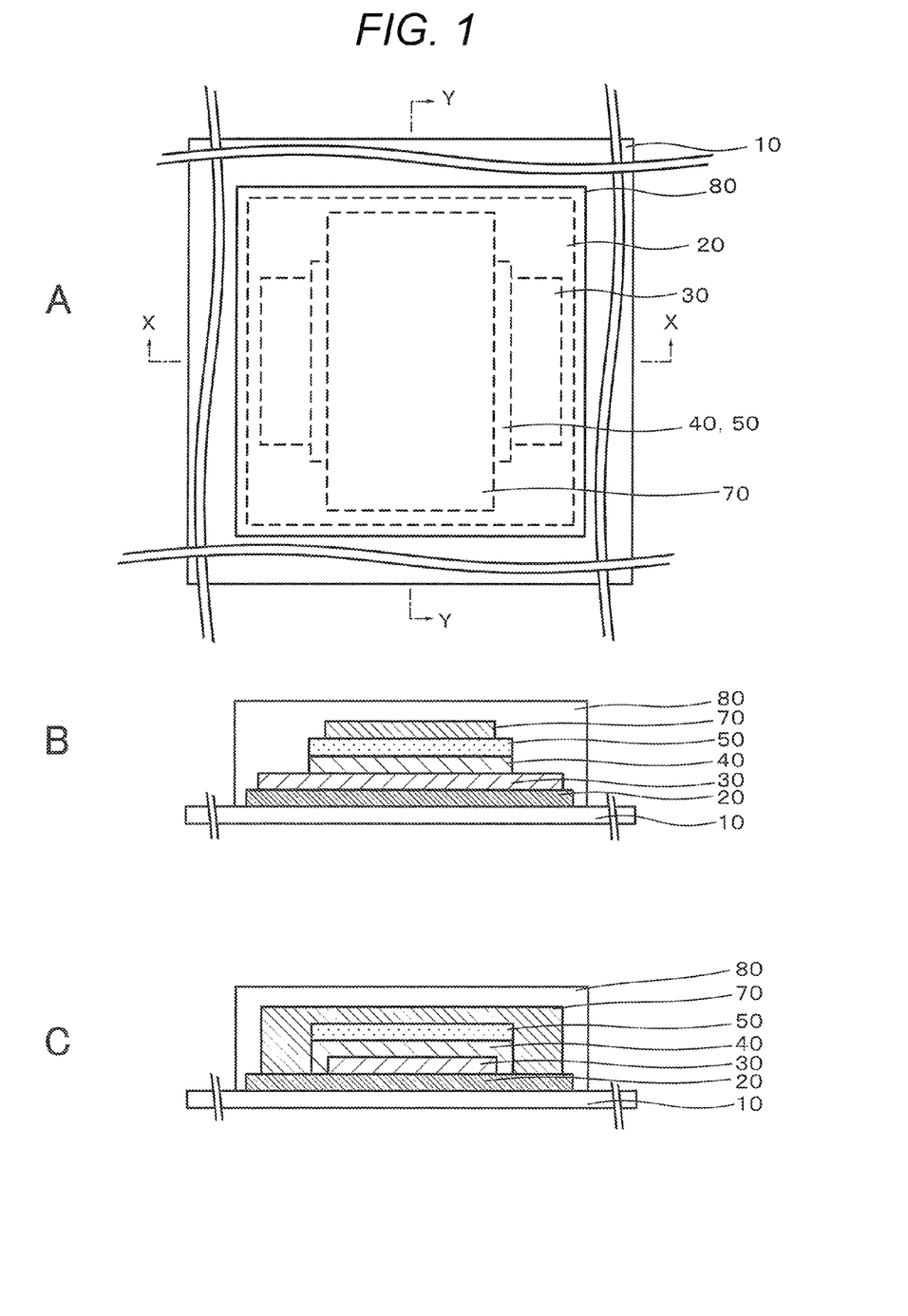
FIG. 1A is a schematic diagram illustrating a configuration example of a solid electrolyte battery according to a first embodiment of the present technique.
FIG. 1B is a cross-sectional view illustrating the configuration example of the solid electrolyte battery according to the first embodiment of the present technique.
FIG. 1C is a cross-sectional view illustrating the configuration example of the solid electrolyte battery according to the first embodiment of the present technique.

FIG. 1 shows the configuration of a solid electrolyte battery according to a first embodiment of the present technique. This solid electrolyte battery is, for example, a solid electrolyte secondary battery that is able to be charged and discharged, and for example, a thin-film solid electrolyte secondary battery that has battery constituent members formed from thin films. FIG. 1A is a plan view of the solid electrolyte battery. FIG. 1B is a cross-sectional view illustrating a cross section of FIG. 1A along the line X-X. FIG. 1C is a cross-sectional view illustrating a cross section of FIG. 1A along the line Y-Y.

As shown in FIG. 1, this solid electrolyte battery has an inorganic insulating film 20 formed on a substrate 10, and has, on the inorganic insulating film 20, a stacked body of a positive electrode current collector film 30, a positive electrode active material film 40, a solid electrolyte film 50, and a negative electrode current collector film 70 stacked in this order. An entirely protective film 80 composed of, for example, an ultraviolet curable resin is formed, so as to entirely cover the stacked body. It is to be noted that the inorganic insulating film 20 may be further formed on the entirely protective film 80.

(Substrate)

As the substrate 10, for example, polycarbonate (PC) resin substrates, fluorine resin substrates, polyethylene terephthalate (PET) substrates, polybutylene terephthalate (PBT) substrates, polyimide (PI) substrates, polyamide (PA) substrates, polysulfone (PSF) substrates, polyethersulfone (PES) substrates, polyphenylene sulfide (PPS) substrates, polyetheretherketone (PEEK) substrates, polyethylene naphthalate (PEN), cycloolefin polymers (COP), and the like can be used. While the material of the substrate is not to be considered particularly limited, moisture-resistant substrates are more preferred which are low in hygroscopicity.

(Positive Electrode Current Collector Film 30)

Cu, Mg, Ti, Fe, Co, Ni, Zn, Al, Ge, In, Au, Pt, Ag, Pd, and the like, or alloys containing any of these metals can be used as a material constituting the positive electrode current collector film 30.

(Positive Electrode Active Material Film 40)

The positive electrode active material film 40 is composed of a lithium-boric acid compound in an amorphous state. For example, the positive electrode active material film 40 is composed of a lithium-boric acid compound in an amorphous state, which contains: Li; B; any element M1 selected from Cu, Ni, Co, Mn, Au, Ag, and Pd; and O.

This lithium-boric acid compound has the following excellent properties as a positive electrode active material. More specifically, the compound has a high electrical potential with respect to $Li^+/Li$. The compound is excellent in electrical potential flatness, that is, the variation in electrical potential is small with changes in composition. The compound has a high compositional ratio of lithium, and thus a high capacity. The compound has a high electrical conductivity. Unlike crystalline positive electrode active materials, the crystal structure of the compound is not collapsed or the like by repeated charging and discharging, and the compound is thus also excellent in charge-discharge cycle characteristics. In addition, the compound can be formed in a non-annealing way, thus allowing simplification of the production process, improvements in yield, and the use of resin substrates which have low heat resistance.

The applicant now has invented, as a novel positive electrode active material, a lithium-phosphoric acid compound represented by the formula (1) for an amorphous state, and filed an application of this invention for a patent. (Japanese Patent Application No. 2009-263417)

Formula (1)

(In the formula, x represents a compositional ratio of lithium. y represents a compositional ratio of copper. x meets $1.0 \leq x \leq 5.0$. y meets $1.0 \leq y \leq 4.0$.)

The material which functions as a positive electrode active material in an amorphous state (which may be also referred to as an amorphous positive electrode active material) as described above exhibits favorable characteristics, and the practical use is highly achieved by applying the material to, in particular, thin-film solid electrolyte batteries that have respective battery constituent members such as positive electrodes, electrolytes, and negative electrodes formed from thin films.

In comparing the molecular weights of cations constituting salts between the lithium-boric acid compound according to the present technique and the amorphous positive electrode active material (lithium-phosphoric acid compound), the borate ion $(BO_3^{3-})$ is smaller in molecular weight as compared with the phosphate ion ($PO_4^{3-}$). Therefore, the lithium-boric acid compound according to the present technique is high in theoretical capacity as compared with the amorphous positive electrode active material (lithium-phosphoric acid compound), and considered to be able to achieve a further increase in capacity. In addition, the lithium-boric acid compound according to the present technique is considered to be less likely to expand and contract, as compared with the lithium-phosphoric acid compound. Therefore, it is conceived that the change in the volume of the positive electrode active material film with charge and discharge can be further suppressed, and the battery characteristic degradation with charge and discharge can be further suppressed.

The positive electrode active material film 40 may be composed of a lithium-boric acid compound in an amorphous state, which contains: Li; B; any element M1 selected from Cu, Ni, Co, Mn, Au, Ag, and Pd; at least one element M2 (M1≠M2) selected from Cu, Ni, Co, Mn, Au, Ag, and Pd; and O.

The positive electrode active material film 40 may be composed of a lithium-boric acid compound in an amorphous state, which contains: Li; B; any element M1 selected from Cu, Ni, Co, Mn, Au, Ag, and Pd; at least one element M2 (M1≠M2) selected from Cu, Ni, Co, Mn, Au, Ag, and Pd; at least one additive element M3 selected from P, Mg, Al, Si, Ti, V, Cr, Fe, Zn, Ga, Ge, Nb, Mo, In, Sn, Sb, Te, W, Os, Bi, Gd, Tb, Dy, and Zr; and O.

This positive electrode active material film 40 is a completely amorphous single-phase thin film containing no crystalline phase. The amorphous single phase of the positive electrode active material film 40 can be confirmed by observing a cross section of the film under a transmission electron microscope (TEM; transmission electron microscope). More specifically, when a cross section of the positive electrode active material film 40 is observed under a transmission electron microscope (TEM), the state with no crystal grains present can be confirmed in the TEM image. Furthermore, the state can be also confirmed from an image of electron beam diffraction.

(Solid Electrolyte Film 50)

Lithium phosphate ($Li_3PO_4$), $Li_3PO_{4-x}N_x$ (generally referred to as LiPON) of lithium phosphate ($Li_3PO_4$) with nitrogen added thereto, $Li_xB_2O_{3-y}N_y$, $Li_4SiO_4$—$Li_3PO_4$, $Li_4SiO_4$—$Li_3VO_4$, and the like can be used as a material constituting the solid electrolyte film 50. It is to be noted that the suffixes x and y used in the compounds represent the compositional ratios of the elements in the formulas.

(Li Excessive Layer)

In this solid electrolyte battery, at the time of production, the negative electrode active material is produced on the negative electrode side with charging, without forming any negative electrode active material film. Produced on the negative electrode side is a layer (hereinafter, referred to as a Li excessive layer) excessively containing a Li metal produced between the negative electrode current collector film 70 and the solid electrolyte film 50 and/or Li at the negative electrode interface of the solid electrolyte film 50. The battery has high durability against repeated charge and discharge without damaging the charge-discharge characteristics, while using this excessively deposited Li (Li excessive layer) as a negative electrode active material.

(Negative Electrode Current Collector Film 70)

Cu, Mg, Ti, Fe, Co, Ni, Zn, Al, Ge, In, Au, Pt, Ag, Pd, and the like, or alloys containing any of these metals can be used as a material constituting the negative electrode current collector film 70.

(Inorganic Insulating Film 20)

The material constituting the inorganic insulating film 20 may be any material as long as the material can form a moisture-resistant film that is low in hygroscopicity. As such a material, single oxides or nitrides or sulfides of Si, Cr, Zr, Al, Ta, Ti, Mn, Mg, and Zn, or mixtures thereof can be used. More specifically, $Si_3N_4$, $SiO_2$, $Cr_2O_3$, $ZrO_2$, $Al_2O_3$, $TaO_2$, $TiO_2$, $Mn_2O_3$, MgO, ZnS, and the like, or mixtures thereof are used.

(Method for Manufacturing Solid Electrolyte Battery)

The solid electrolyte battery described above is manufactured, for example, in the following way.

First, the inorganic insulating film 20 is formed on the substrate 10. Next, the positive electrode current collector film 30, the positive electrode active material film 40, the solid electrolyte film 50, and the negative electrode current collector film 70 are sequentially formed on the inorganic insulating film 20, thereby forming a stacked body. Next, the entirely protective film 80 composed of, for example, an ultraviolet curable resin or the like is formed on the substrate 10 such as, for example, an organic insulating substrate, so as to entirely cover the stacked body and the inorganic insulating film 20. The solid electrolyte battery according to the first embodiment of the present technique can be formed in accordance with the series of steps described above.

(Method for Forming Thin Film)

Methods will be described for forming the inorganic insulating film 20, the positive electrode current collector film 30, the positive electrode active material film 40, the solid electrolyte film 50, and the negative electrode current collector film 70.

The respective thin films can be formed by gas-phase methods such as PVD (Physical Vapor Deposition) methods or CVD (Chemical Vapor Deposition) methods. In addition, the thin films can be formed by liquid-phase methods such as electroplating, electroless plating, coating methods, and sol-gel methods. In addition, the thin films can be formed by solid-phase methods such as SPE (solid-phase epitaxy) methods and LB (Langmuir-Blodgett) methods.

The PVD methods refer to methods in which a thin-film raw material to be formed into a thin film is evaporated or vaporized once by energy such as heat or plasma to form a thin film on a substrate. The PVD methods include a vacuum vapor deposition method, a sputtering method, an ion plating method, an MBE (molecular beam epitaxy) method, and a laser abrasion method.

The CVD methods refer to methods in which energy such as heat, light, or plasma is applied to a thin-film constituent material supplied as a gas to form decomposition, reaction, and intermediate products form the raw material gas molecules, and deposit a thin film through adsorption, reaction, and desorption on a substrate surface.

The CVD methods include, for example, a thermal CVD method, an MOCVD (Metal Organic Chemical Vapor Deposition) method, an RF plasma CVD method, an optical CVD method, a laser CVD method, and an LPE (Liquid Phase Epitaxy) method.

One skilled in the art could have easily formed the inorganic insulating film 20, positive electrode current collector film 30, positive electrode active material film 40, solid electrolyte film 50, and negative electrode current collector film 70 desired configurations, by the thin-film formation methods mentioned above. More specifically, one skilled in the art could have easily formed the inorganic insulating film 20, positive electrode active material film 40, solid electrolyte film 50, and negative electrode current collector film 70 desired configurations, by appropriately selecting thin-film raw materials, thin-film formation methods, the conditions for the thin-film formation, etc.

In the first embodiment according to the present technique, the positive electrode active material film 40 is composed of a lithium-boric acid compound in an amorphous state, which contains: Li; B; any element M1 selected from Cu, Ni, Co, Mn, Au, Ag, and Pd; and O. This makes it possible to obtain a solid electrolyte battery which has excellent characteristics.

In addition, in the first embodiment according to the present technique, the positive electrode active material film 40 even in a non-annealing way functions as a positive electrode active material. This makes it possible to use, as the substrate 10, resin substrates which have low heat resistance, and to reduce the manufacturing cost because there is no need to use expensive heat-resistant glass or the like.

2. Second Embodiment

A solid electrolyte battery according to a second embodiment of the present technique will be described. This solid electrolyte battery is, for example, a solid electrolyte secondary battery that is able to be charged and discharged, and for example, a thin-film solid electrolyte secondary battery that has battery constituent members formed from thin films.

(Configuration Example of Solid Electrolyte Battery)

Figure 2:
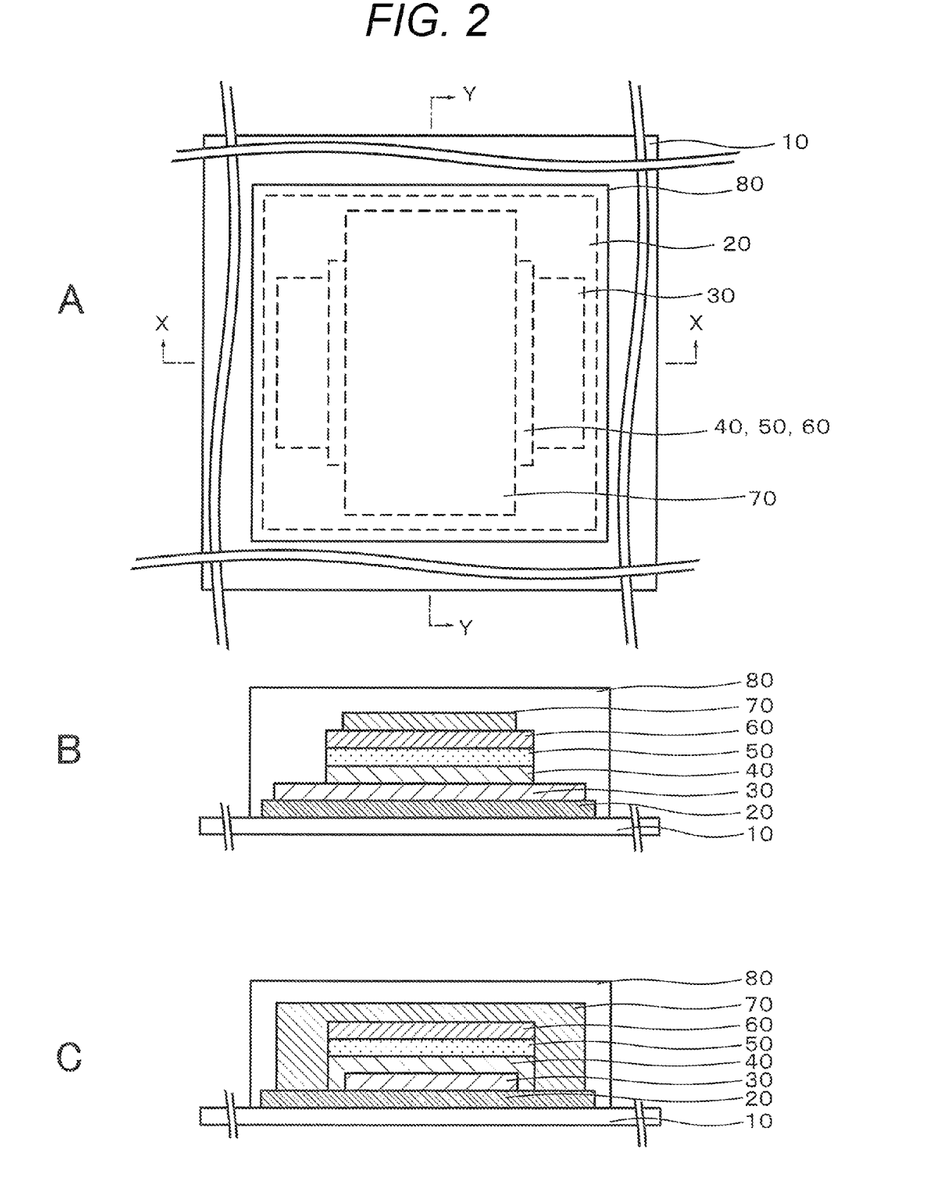
FIG. 2A is a schematic diagram illustrating a configuration example of a solid electrolyte battery according to a second embodiment of the present technique.
FIG. 2B is a cross-sectional view illustrating the configuration example of the solid electrolyte battery according to the second embodiment of the present technique.
FIG. 2C is a cross-sectional view illustrating the configuration example of the solid electrolyte battery according to the second embodiment of the present technique.

FIG. 2 shows a configuration example of a solid electrolyte battery according to the second embodiment of the present technique. FIG. 2A is a plan view of the solid electrolyte battery. FIG. 2B is a cross-sectional view illustrating a cross section of FIG. 2A along the line X-X. FIG. 2C is a cross-sectional view illustrating a cross section of FIG. 2A along the line Y-Y.

This solid electrolyte battery has an inorganic insulating film 20 formed on a substrate 10, and has, on the inorganic insulating film 20, a stacked body of a positive electrode current collector film 30, a positive electrode active material film 40, a solid electrolyte film 50, a negative electrode active material film 60, and a negative electrode current collector film 70 stacked in this order. An entirely protective film 80 composed of, for example, an ultraviolet curable resin or the like is formed, so as to entirely cover the stacked body and the inorganic insulating film 20. It is to be noted that the inorganic insulating film 20 may be further formed on the entirely protective film 80.

The substrate 10, inorganic insulating film 20, positive electrode current collector film 30, positive electrode active material film 40, solid electrolyte film 50, negative electrode current collector film 70, and entirely protective film 80 are the same as those in the first embodiment, and the description thereof will be thus omitted. The negative electrode active material film 60 is configured as follows.

(Negative Electrode Active Material Film)

The material constituting the negative electrode active material film 60 may be any material, as long as the material is likely to store and desorb lithium ions, and able to store and desorb many lithium ions onto and from the negative electrode active material film. As such a material, oxides of any of Sn, Si, Al, Ge, Sb, Ag, Ga, In, Fe, Co, Ni, Ti, Mn, Ca, Ba, La, Zr, Ce, Cu, Mg, Sr, Cr, Mo, Nb, V, Zn, etc. can be used. In addition, these oxides can be also used as mixtures.

The material of the negative electrode active material film 60 is specifically, for example, a silicon-manganese alloy (Si—Mn), a silicon-cobalt alloy(Si—Co), a silicon-nickel alloy (Si—Ni), a niobium pentoxide ($Nb_2O_5$), a vanadium oxide ($V_2O_5$), a titanium oxide ($TiO_2$), an indium oxide ($In_2O_3$), a zinc oxide (ZnO), a tin oxide ($SnO_2$), a nickel oxide (NiO), an indium oxide with Sn added thereto (ITO), a zinc oxide with Al added thereto (AZO), a zinc oxide with Ga added thereto (GZO), a tin oxide with Sn added thereto (ATO), a tin oxide with F (fluorine) added thereto (FTC)), etc. In addition, these can be used as mixtures. In addition, a Li metal may be used as a material constituting the negative electrode active material film 60

(Method for Manufacturing Solid Electrolyte Battery)

The solid electrolyte battery described above is manufactured, for example, in the following way.

First, the inorganic insulating film 20 is formed on the substrate 10. Next, the positive electrode current collector film 30, the positive electrode active material film 40, the solid electrolyte film 50, the negative electrode active material film 60, and the negative electrode current collector film 70 are sequentially formed on the inorganic insulating film 20, thereby forming a stacked body. Next, the entirely protective film 80 composed of, for example, an ultraviolet curable resin is formed on the substrate 10, so as to entirely cover the stacked body and the inorganic insulating film 20. The solid electrolyte battery according to the second embodiment of the present technique can be formed in accordance with the series of steps described above.

The second embodiment according to the present technique has the same effect as in the first embodiment. More specifically, in the second embodiment, the positive electrode active material film 40 is composed of a lithium-boric acid compound in an amorphous state, which contains: Li; B; any element M1 selected from Cu, Ni, Co, Mn, Au, Ag, and Pd; and O. This makes it possible to obtain a solid electrolyte battery which has excellent characteristics.

In addition, in the second embodiment according to the present technique, the positive electrode active material film 40 even in a non-annealing way functions as a positive electrode active material. This makes it possible to use, as the substrate 10, resin substrates which have low heat resistance, and to reduce the manufacturing cost because there is no need to use expensive heat-resistant glass or the like.

EXAMPLES

While the present technique will be specifically described with reference to examples, the present technique is not to be considered limited to only these examples.

Example 1-1

A solid electrolyte battery was prepared which was configured as shown in FIG. 1. A polycarbonate (PC) substrate of 1.1 mm in thickness was used as the substrate 10. An SiN film was, as the inorganic insulating film 20, formed on the substrate 10.

With a metal mask placed on the inorganic insulating film 20, the positive electrode current collector film 30, the positive electrode active material film 40, the solid electrolyte film 50, and the negative electrode current collector film 70 were formed in this order in a predetermined region to form a stacked body. A Ti film, a $Li_xCu_yBO_z$ film, a $Li_3PO_{4-x}N_x$ film (LiPON film), and a Cu film and a Ti film were formed respectively as the positive electrode current collector film 30, the positive electrode active material film 40, the solid electrolyte film 50, and the negative electrode current collector film 70. It is to be noted that the suffixes x, y and z used in the compounds represent the compositional ratios of the elements in the formulas. (The same applies to the following description.)

The conditions for forming the respective thin film constituting the inorganic insulating film 20 and stacked body were set as follows. It is to be noted that a substrate holder was subjected to water cooling at 20° C. for forming the films, while the substrate 10 was not subjected to substrate heating.

(Inorganic Insulating Film 20)

The inorganic insulating film 20 was formed in the following sputtering apparatus and under the following film formation conditions.
Sputtering Apparatus (C-3103 from ANELVA)
Target Composition: Si
Target Size: Φ6 inches
Sputtering Gas: Ar: 60 sccm, $N_2$: 30 sccm, 0.093 Pa
Sputtering Power: 1500 W (DC)
Film Thickness: 25 nm (Positive Electrode Current Collector Film 30)

The positive electrode current collector film 30 was formed in the following sputtering apparatus and under the following film formation conditions.
Sputtering Apparatus (Special Model SMO-01 from ULVAC, Inc.)
Target Composition: Ti
Target Size: Φ4 inches
Sputtering Gas: Ar: 70 sccm, 0.45 Pa
Sputtering Power: 1000 W (DC)
Film Thickness: 100 nm (Positive Electrode Active Material Film 40)

The positive electrode active material film was formed in the following sputtering apparatus and under the following film formation conditions.
Sputtering Apparatus (Special Model SMO-01 from ULVAC, Inc.)
Target Composition: Co-sputter of $Li_6C_9O_6B$ and Cu
Target Size: φ4 inches
Sputtering Gas: Ar (80%)+$O_2$ (20%): 20 sccm, 0.17 Pa
Sputtering Power: $Li_6C_9O_6B$: 600 W (RF), Cu: 60 W (DC)
Film Thickness: 370 nm It is to be noted that the target material ($Li_6C_9O_6B$) with a high compositional ratio of lithium was used, in order to increase the capacity by increasing the compositional ratio of lithium in the positive electrode active material film. This target material was prepared in the following way. (The same applies to Example 1-2 and Example 2-1 to Example 2-3 below.)

As raw material powders, a $Li_2CO_3$ powder and a boron powder were weighed in predetermined blending proportions, and mixed with the use of a ball mill to obtain a mixed powder. Next, this mixed powder was subjected to firing to obtain a $Li_6C_9O_6B$ powder. Next, the $Li_6C_9O_6B$ powder was subjected to press forming with the use of a tablet forming machine, and then to sintering to obtain a $Li_6C_9O_6B$ sintered body for use as a target.

(Solid Electrolyte Film 50)

The solid electrolyte film 50 was formed in the following sputtering apparatus and under the following film formation conditions.
Sputtering Apparatus (Special Model SMO-01 from ULVAC, Inc.)
Target Composition: $Li_3PO_4$
Target Size: Φ4 inches
Sputtering Gas: Ar: 20 sccm+$N_2$: 20 sccm, 0.25 Pa
Sputtering Power: 600 W (RF)
Film Thickness: 650 nm (Negative Electrode Current Collector Film 70)

As the negative electrode current collector film 70, a Cu film and a Ti film were formed in this order on the solid electrolyte film 50. The Cu film and the Ti film were each formed in the following sputtering apparatus and under the following film formation conditions.

(Negative Electrode Current Collector Film 70 (Cu Film))

The negative electrode current collector film 70 (Cu film) was formed in the following sputtering apparatus and under the following film formation conditions.
Sputtering Apparatus (Special Model SMO-01 from ULVAC, Inc.)
Target Composition: Cu
Target Size: Φ4 inches
Sputtering Gas: Ar: 70 sccm, 0.45 Pa
Sputtering Power: 1000 W (DC)
Film Thickness: 20 nm (Negative Electrode Current Collector Film 70 (Ti Film))

The negative electrode current collector film 70 (Ti film) was formed in the following sputtering apparatus and under the following film formation conditions.
Sputtering Apparatus (Special Model SMO-01 from ULVAC, Inc.)
Target Composition: Ti
Target Size: Φ4 inches
Sputtering Gas: Ar: 70 sccm, 0.45 Pa
Sputtering Power: 1000 W (DC)
Film Thickness: 100 nm Finally, the entirely protective film 80 was formed with the use of an ultraviolet curable resin (Model Number SK3200 from Sony Chemical & Information Device Corporation), and an inorganic insulating film was further formed on the ultraviolet curable resin under the same film formation conditions as mentioned above. The solid electrolyte battery according to Example 1-1 was obtained as described above. More specifically, the solid electrolyte battery according to Example 1-1 was obtained, which was adapted to have the following film configuration. It is to be noted that the size of the solid electrolyte battery was adapted to 0.75 cm×0.75 cm in terms of the area of the positive electrode active material film 40.

(Film Configuration of Solid Electrolyte Battery)

Polycarbonate Substrate/SiN (25 nm)/Ti (100 nm)/$Li_xCu_y$-$BOy$ (370 nm)/$Li_3PO_{4-x}N_x$ (650 nm)/Cu (20 nm)/Ti (100 nm)/Ultraviolet Curable Resin (20 μm)/SiN (25 nm)

Example 1-2

A solid electrolyte battery was prepared to have a configuration of: Polycarbonate Substrate/SiN (25 nm)/Ti (100 nm)/$Li_xNi_yBO_x$ (300 nm)/$Li_3PO_{4-x}N_x$ (650 nm)/Ni (230 nm)/Ultraviolet Curable Resin (20 μm)/SiN (25 nm). More specifically, the solid electrolyte battery was prepared in the same way as in Example 1-1, except that the positive electrode active material film 40 and the negative electrode current collector film 70 were formed under the following formation conditions.

(Positive Electrode Active Material Film 40)

The positive electrode active material film 40 was formed in the following sputtering apparatus and under the following film formation conditions.
Sputtering Apparatus (Special Model SMO-01 from ULVAC, Inc.)
Target Composition: Co-sputter of $Li_6C_9O_6B$ and Ni
Target Size: Φ4 inches
Sputtering Gas: Ar (80%)+$O_2$ (20%): 20 sccm, 0.17 Pa
Sputtering Power: $Li_6C_9O_6B$: 600 W (RF), Ni: 150 W (DC)
Film Thickness: 300 nm (Negative Electrode Current Collector Film 70)

The negative electrode current collector film 70 was formed in the following sputtering apparatus and under the following film formation conditions.

Sputtering Apparatus (Special Model SMO-01 from ULVAC, Inc.)
Target Composition: Ni
Target Size: Φ4 inches
Sputtering Gas: Ar: 70 sccm, 0.45 Pa
Sputtering Power: 1000 W (DC)
Film Thickness: 230 nm
(Charge-Discharge Test)

The solid electrolyte batteries according to Example 1-1 and Example 1-2 were subjected to a charge-discharge test. The charge was carried out at a charging current of 30 μA and a charging cut-off voltage of 5.0 V. The discharge was carried out at a discharging current of 15 μA and a discharging cut-off voltage of 2.0 V.

Figure 3:
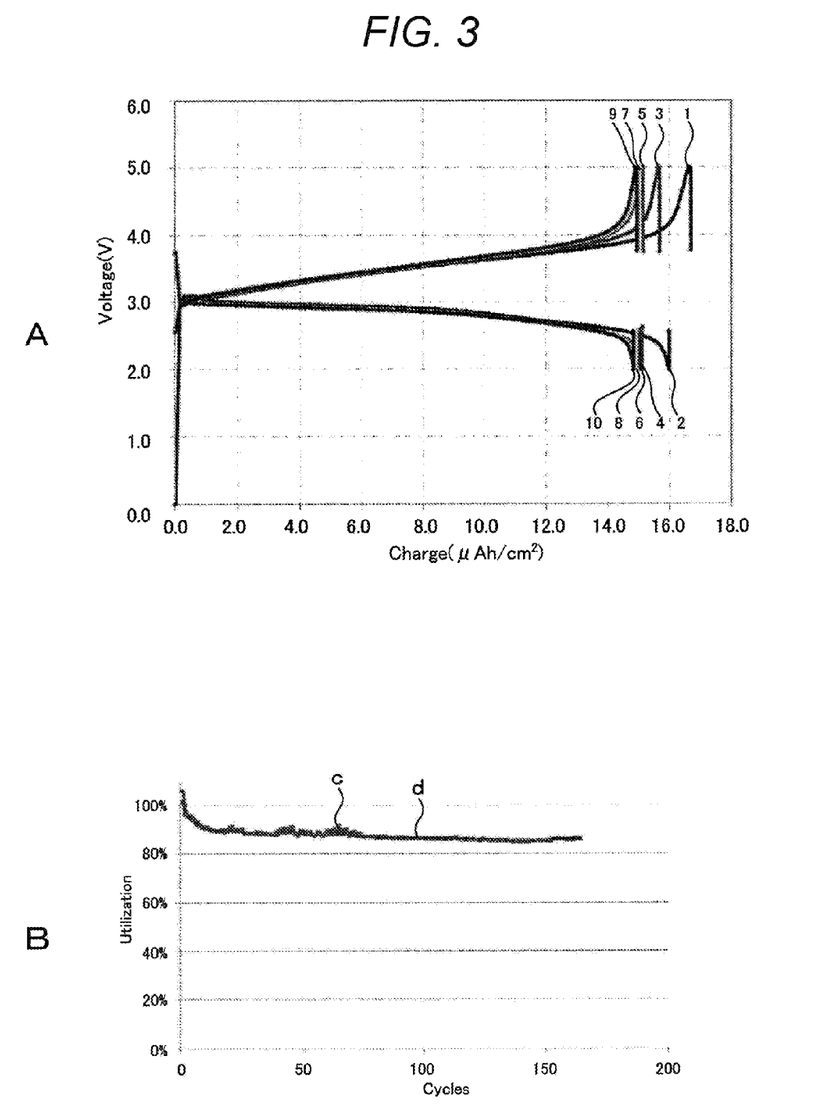
FIG. 3A is a graph showing charge-discharge curves for a solid electrolyte battery according to Example 1-1.
FIG. 3B is a graph showing cycle characteristics for the solid electrolyte battery according to Example 1-1.

The measurement results are shown in FIGS. 3A, 3B, 4A, and 4B. FIG. 3A shows a charge-discharge curve for Example 1-1. In FIG. 3A, the indicated odd numbers n=1, 3, 5, . . . and even numbers n=2, 4, . . . assigned to the charge-discharge curve respectively represent charging and discharging. For example, the odd number n=1 represents the first cycle of charge curve, and the even number n=2 represents the first cycle of discharge curve. More particularly, the odd number n=K represents the $\{(K+1)/2\}$-th cycle of charge curve, whereas the even number n=L represents the $(K/2)$-th cycle of discharge curve.

FIG. 3B shows charge-discharge cycle characteristics for Example 1-1. The line c is a graph of the rate of change in charging capacity (relative value (%) in the case of regarding the charging capacity in the first cycle as 100%) plotted with respect to the cycle number. The line d is a graph of the rate of change in discharging capacity (relative value (%) in the case of regarding the charging capacity in the first cycle as 100%) plotted with respect to the cycle number.

Figure 4:
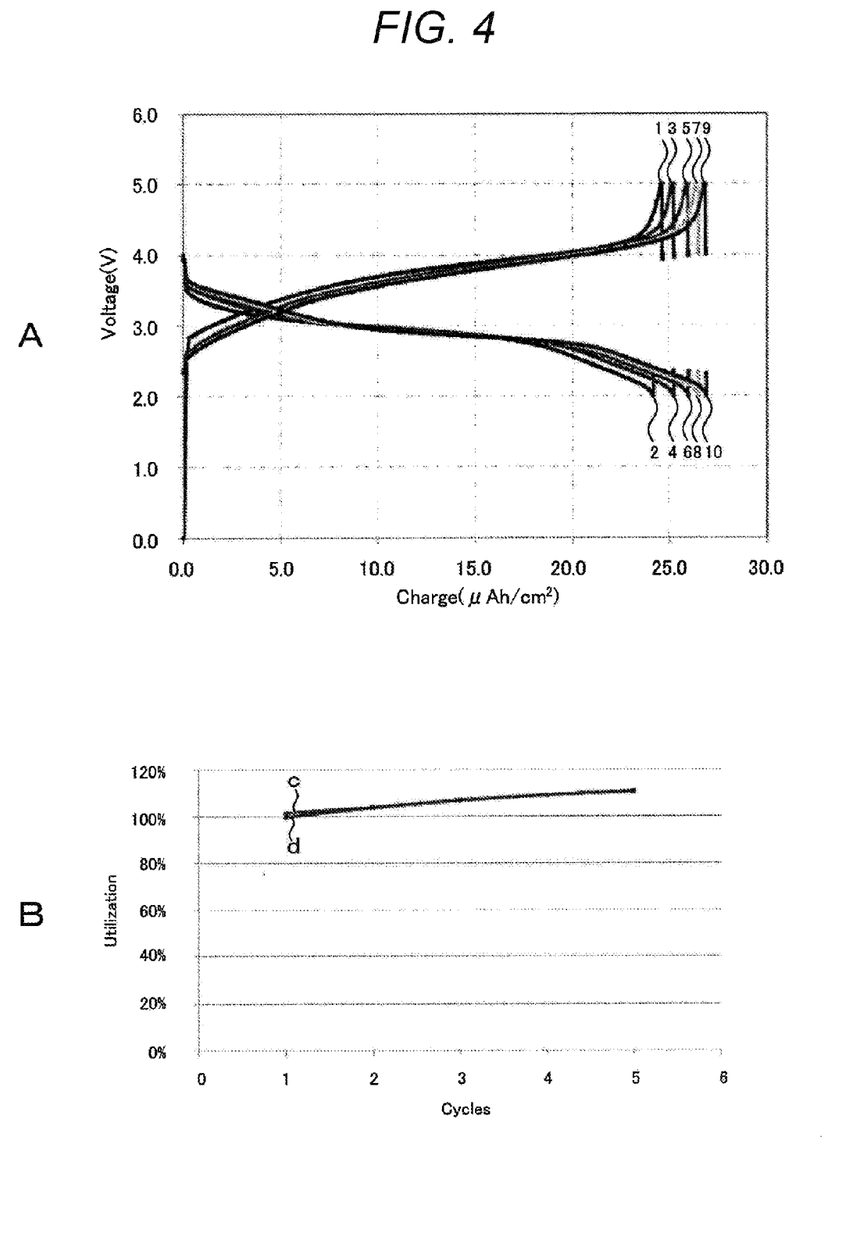
FIG. 4A is a graph showing charge-discharge curves for a solid electrolyte battery according to Example 1-2.
FIG. 4B is a graph showing cycle characteristics for the solid electrolyte battery according to Example 1-2.

FIG. 4A shows a charge-discharge curve for Example 1-2. FIG. 4B shows charge-discharge cycle characteristics for Example 1-2. It is to be noted that the odd numbers and even numbers n assigned to the charge-discharge curve in FIG. 4A have the same meanings as those in FIG. 3A, and the lines c and d in FIG. 4B are graphs which are synonymous with those in FIG. 3B.

As shown in FIGS. 3A and 3B, the solid electrolyte battery according to Example 1-1 is excellent in discharge potential flatness, and also excellent in cycle characteristics. As shown in FIGS. 4A and 4B, the solid electrolyte battery according to Example 1-2 is excellent in discharge potential flatness, and also excellent in cycle characteristics.

In addition, in the case of calculation with the film density 3.4 g/cc of the positive electrode active material film, the capacity was 140 mAh/g in Example 1-1, whereas the capacity was 270 mAh/g in Example 1-2. In particular, the positive electrode active material $Li_xNi_yBO_z$ according to Example 1-2 exhibited a higher capacity, as compared with the capacity (100 mAh/g to 200 mAh/g) for a positive electrode active material in an average lithium ion battery.

Example 2-1 to Example 2-3

Example 2-1

A solid electrolyte battery was prepared in the same way as in Example 1-2, except that the positive electrode active material film 40 was formed under the following formation conditions.
(Positive Electrode Active Material Film 40)
The positive electrode active material film 40 was formed in the following sputtering apparatus and under the following film formation conditions.
Sputtering Apparatus (Special Model SMO-01 from ULVAC, Inc.)
Target Composition: Co-sputter of $Li_6C_9O_6B$ and Ni
Target Size: Φ4 inches
Sputtering Gas: Ar (80%)+$O_2$ (20%): 20 sccm, 0.17 Pa
Sputtering Power: $Li_6C_9O_6B$: 600 W (RF), Ni: 50 W (DC)
Film Thickness: 210 nm Example 2-2

A solid electrolyte battery was prepared in the same way as in Example 1-2, except that the positive electrode active material film 40 was formed under the following formation conditions.
(Positive Electrode Active Material Film 40)
The positive electrode active material film 40 was formed in the following sputtering apparatus and under the following film formation conditions.
Sputtering Apparatus (Special Model SMO-01 from ULVAC, Inc.)
Target Composition: Co-sputter of $Li_6C_9O_6B$ and Ni
Target Size: Φ4 inches
Sputtering Gas: Ar (80%)+$O_2$ (20%): 20 sccm, 0.17 Pa
Sputtering Power: $Li_6C_9O_6B$: 600 W (RF), Ni: 100 W (DC)
Film Thickness: 250 nm Example 2-3

Figure 5:
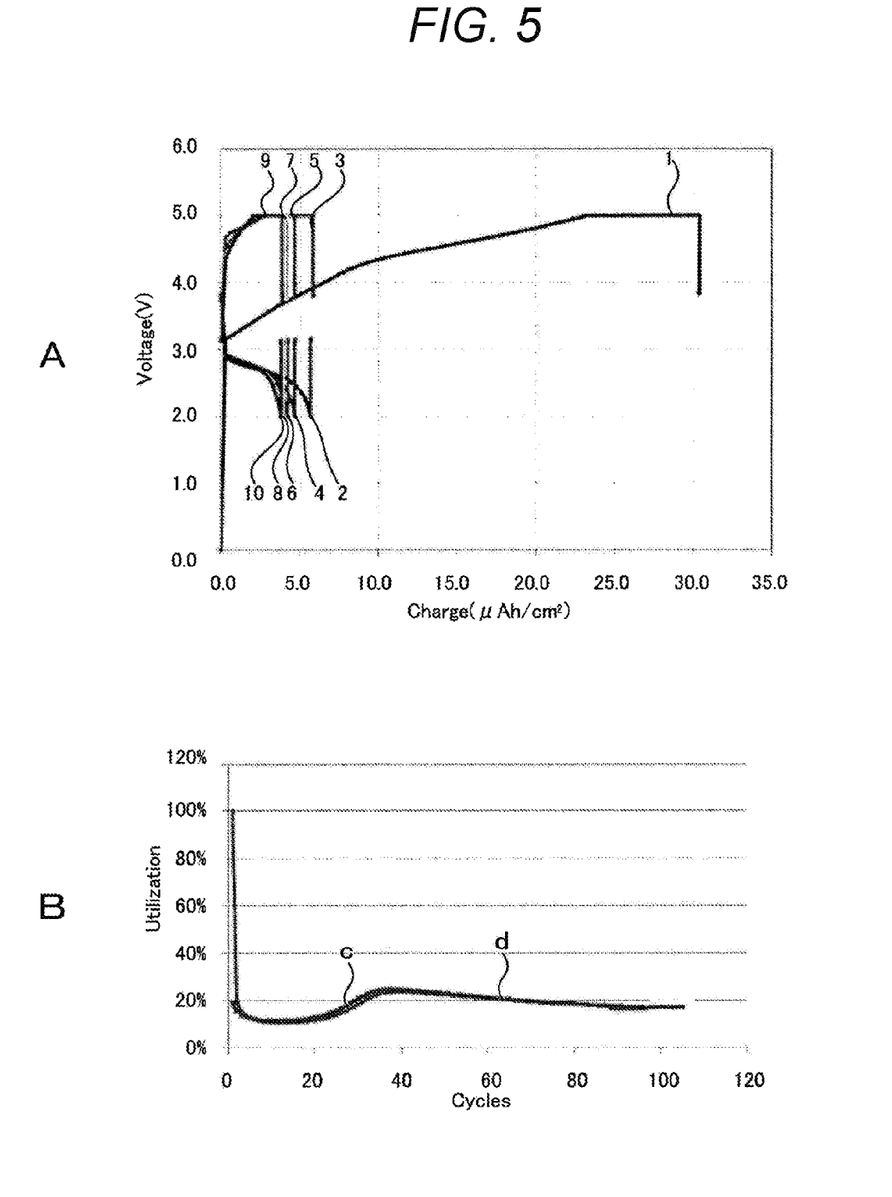
FIG. 5A is a graph showing charge-discharge curves for a solid electrolyte battery according to Example 2-1.
FIG. 5B is a graph showing cycle characteristics for the solid electrolyte battery according to Example 2-1.
Figure 6:
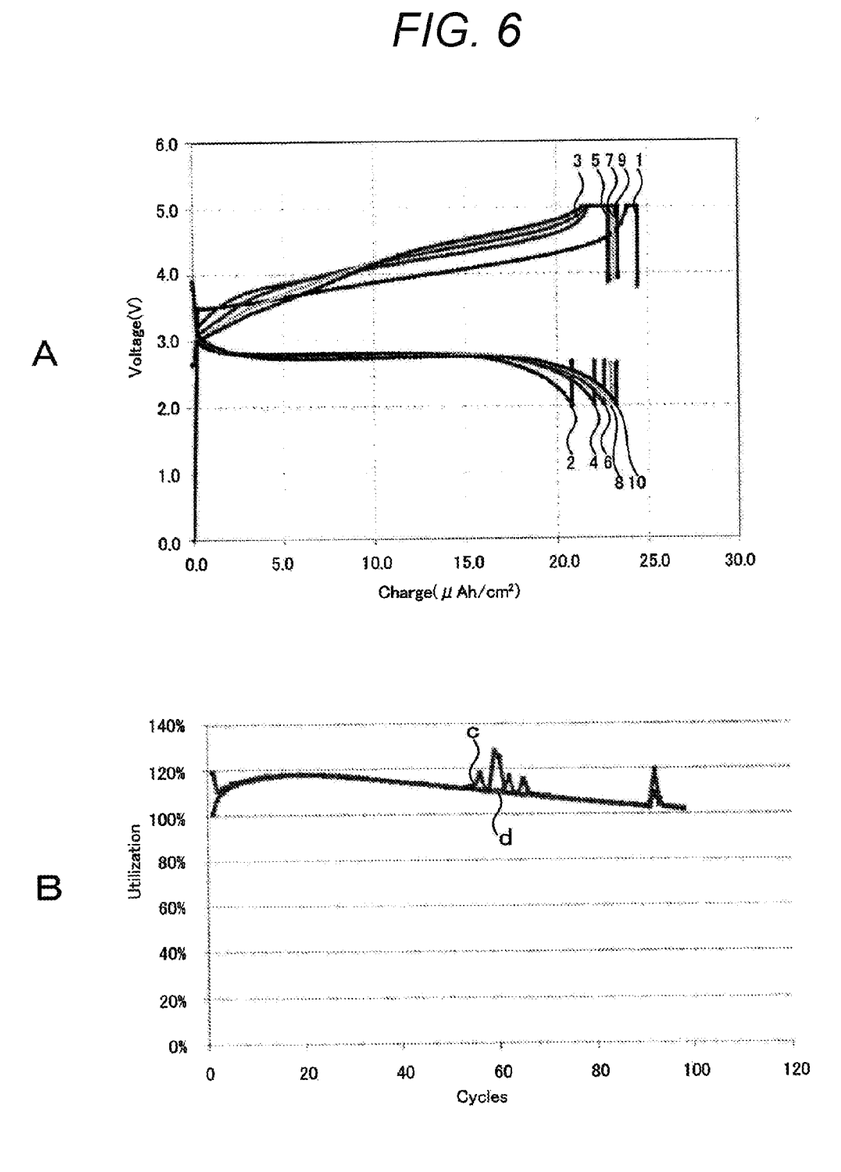
FIG. 6A is a graph showing charge-discharge curves for a solid electrolyte battery according to Example 2-2.
FIG. 6B is a graph showing cycle characteristics for the solid electrolyte battery according to Example 2-2.
Figure 7:
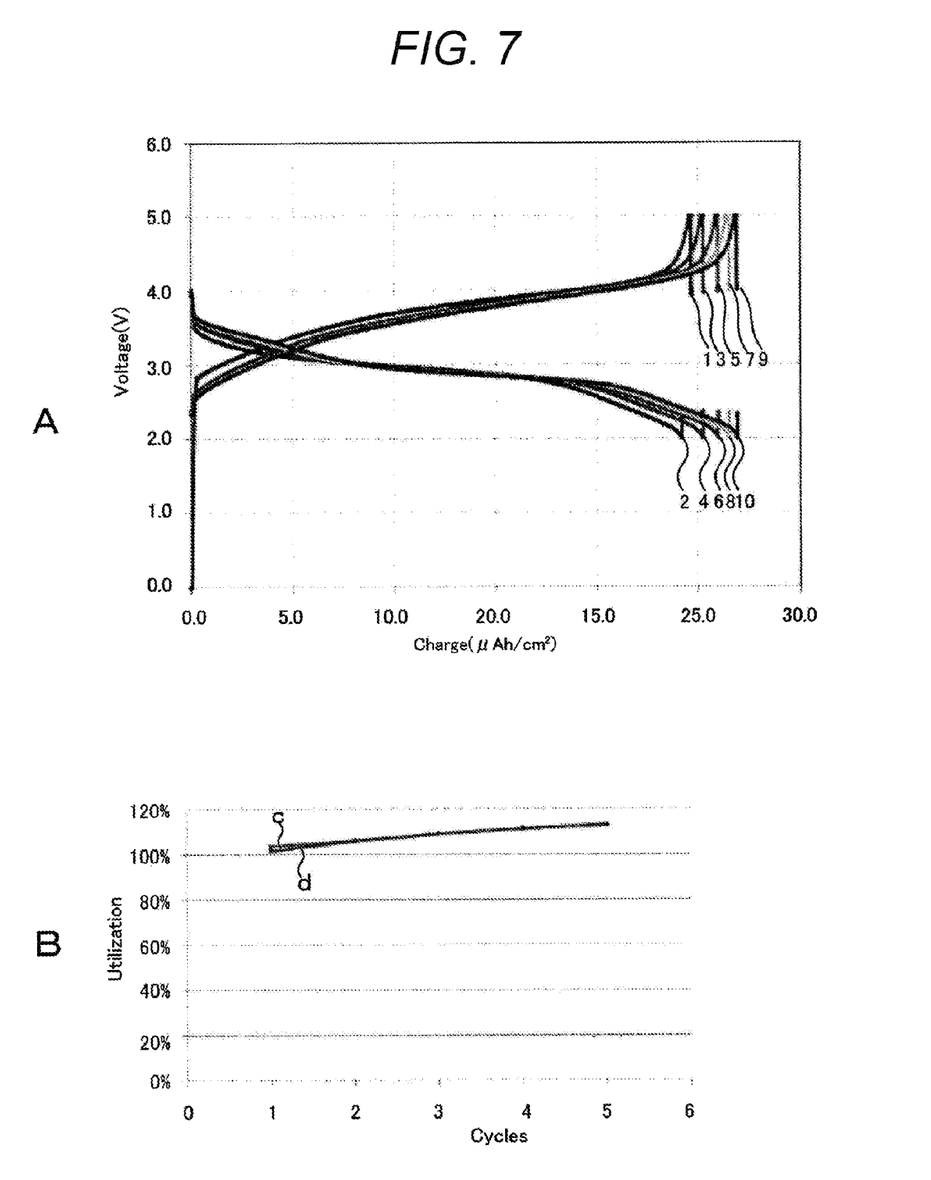
FIG. 7A is a graph showing charge-discharge curves for a solid electrolyte battery according to Example 2-3.
FIG. 7B is a graph showing cycle characteristics for the solid electrolyte battery according to Example 2-3.

A solid electrolyte battery was prepared in the same way as in Example 1-2, except that the positive electrode active material film 40 was formed under the following formation conditions.
(Positive Electrode Active Material Film 40)
The positive electrode active material film 40 was formed in the following sputtering apparatus and under the following film formation conditions.
Sputtering Apparatus (Special Model SMO-01 from ULVAC, Inc.)
Target Composition: Co-sputter of $Li_6C_9O_6B$ and Ni
Target Size: Φ4 inches
Sputtering Gas: Ar (80%)+$O_2$ (20%): 20 sccm, 0.17 Pa
Sputtering Power: $Li_6C_9O_6B$: 600 W (RF), Ni: 150 W (DC)
Film Thickness: 300 nm The respective solid electrolyte batteries according to Example 2-1 to Example 2-3 were subjected to a charge-discharge test. The charge was carried out at a charging current of 30 μA and a charging cut-off voltage of 5.0 V. The discharge was carried out at a discharging current of 15 μA and a discharging cut-off voltage of 2.0 V. The measurement results are shown in FIGS. 5 to 7.

FIG. 5A shows a charge-discharge curve for Example 1-2, whereas FIG. 5B shows charge-discharge cycle characteristics for Example 2-1. FIG. 6A shows a charge-discharge curve for Example 2-2, whereas FIG. 6B shows charge-discharge cycle characteristics for Example 2-2. FIG. 7A shows a charge-discharge curve for Example 2-3, whereas FIG. 7B shows charge-discharge cycle characteristics for Example 2-3. It is to be noted that the odd numbers and even numbers n assigned to the charge-discharge curves in FIGS. 5A, 6A, and 7A have the same meanings as those in FIG. 3A. The lines c and d in FIGS. 5B, 6B, and 7B are graphs which are synonymous with those in FIG. 3B.

Example 2-2 exhibited, in the case of calculation with the film density 3.4 g/cc of the positive electrode active material film, a high capacity of 200 mAh/g to 270 mAh/g in the first to fifth cycles. In addition, Example 2-2 exhibited excellent cycle characteristics, without degradation of the capacity with repeated charge and discharge up to on the order of 100 cycles.

3. Other Embodiments

The present technique is not to be considered limited to the above-described embodiments according to the present technique, and various modifications and applications can be made without departing from the scope of the present technique. For example, the film configuration of the solid-electrolyte battery is not to be considered limited to the configurations mentioned above. For example, the first to second embodiments may be configured with the inorganic insulating films omitted.

In addition, multiple stacked bodies can be formed to be stacked, electrically connected in series, and coated with the entirely protective film 80. In addition, multiple stacked bodies can be formed to be apposed on a substrate, electrically connected in parallel or series, and coated with the entirely protective film 80.

Furthermore, for example, the structure of the solid-electrolyte battery is not to be considered limited to the examples described above. For example, it is also possible to apply the technique to a solid electrolyte battery or the like which has structure with the positive electrode current collector film 30 omitted with the use of an electrically conductive material for the substrate 10. Furthermore, for example, a metallic plate composed of a positive electrode current collector material may constitute the positive electrode current collector film 30. A metallic plate composed of a negative electrode current collector material may constitute the negative electrode current collector film 70.

Furthermore, the present technique can also provide the following configurations.

(1)

A solid electrolyte battery including:

a positive electrode layer including a positive electrode active material layer;

a negative electrode layer; and a solid electrolyte layer placed between the positive electrode layer and the negative electrode layer, where the positive electrode active material layer includes a lithium-boric acid compound in an amorphous state, which contains Li, B, and any element M1 selected from Cu, Ni, Co, Mn, Au, Ag, and Pd, and O.

(2)

The solid electrolyte battery as set forth in (1), where the lithium-boric acid compound further contains as least one element M2 (M1≠M2) selected from Cu, Ni, Co, Mn, Au, Ag, and Pd.

(3)

The solid electrolyte battery as set forth in any of (1) to (2), where the negative electrode layer includes a negative electrode current collector layer, and a lithium excessive layer is formed by charging at the negative electrode interface of the solid electrolyte layer.

(4)

The solid electrolyte battery as set forth in any of (1) to (3), where the positive electrode layer further includes a positive electrode current collector layer.

(5)

The solid electrolyte battery as set forth in (1), where the negative electrode layer includes a negative electrode active material layer and a negative electrode current collector layer.

(6)

The solid electrolyte battery as set forth in any of (1) to (5), where the positive electrode active material layer is formed from a thin film.

(7)

The solid electrolyte battery as set forth in any of (1) to (6), which further includes a substrate, where a stacked body including the positive electrode layer, the negative electrode layer, and the solid electrolyte layer is placed on the substrate.

(8)

The solid electrolyte battery as set forth in any of (1) to (7), where the positive electrode layer, the solid electrolyte layer, and the negative electrode layer are formed from thin films.

(9)

The solid electrolyte battery as set forth in any of (7) to (8), where the substrate is a resin substrate.

(10)

A positive electrode active material wherein the lithium-boric acid compound containing Li, B, and any element M1 selected from Cu, Ni, Co, Mn, Au, Ag, and Pd, and O, has an amorphous state.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST

10 substrate
20 inorganic insulating film
30 positive electrode current collector film
40 positive electrode active material film
50 solid electrolyte film
60 negative electrode active material film
70 negative electrode current collector film
80 entirely protective film

The invention claimed is:

1. A solid electrolyte battery including:
   a positive electrode layer including a positive electrode active material layer;
   a negative electrode layer; and
   a solid electrolyte layer placed between the positive electrode layer and the negative electrode layer,
   where the positive electrode active material layer includes a lithium-boric acid compound in an amorphous state, which contains Li, B, and at least two elements M1 and M2 that satisfy M1≠M2 and that are selected from the group consisting of Cu, Mn, Au, Ag, and Pd.

2. The solid electrolyte battery according to claim 1, wherein the negative electrode layer includes a negative electrode current collector layer, and
   a lithium excessive layer is formed by charging at a negative electrode interface of the solid electrolyte layer.

3. The solid electrolyte battery according to claim 1, wherein the positive electrode layer further includes a positive electrode current collector layer.

4. The solid electrolyte battery according to claim 1, wherein the negative electrode layer includes a negative electrode active material layer and a negative electrode current collector layer.

5. The solid electrolyte battery according to claim 1, wherein the positive electrode active material layer is formed from a thin film.

6. The solid electrolyte battery according to claim 1, the battery further comprising a substrate,
   wherein a stacked body including the positive electrode layer, the negative electrode layer, and the solid electrolyte layer is placed on the substrate.

7. The solid electrolyte battery according to claim 6, wherein the positive electrode layer, the solid electrolyte layer, and the negative electrode layer are formed from thin films.

8. The solid electrolyte battery according to claim 6, wherein the substrate is a resin substrate.

9. A positive electrode active material comprising:
   a lithium-boric acid compound in an amorphous state, which contains Li, B, and at least two elements M1 and M2 that satisfy M1≠M2 and that are selected from the group consisting of Cu, Mn, Au, Ag, and Pd.

* * * * *